(12) United States Patent
Furuichi

(10) Patent No.: US 10,567,973 B2
(45) Date of Patent: Feb. 18, 2020

(54) COMMUNICATION CONTROL DEVICE, STORAGE DEVICE, COMMUNICATION CONTROL DETERMINATION DEVICE, AND SERVER DEVICE

(71) Applicant: SONY CORPORATION, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/745,562

(22) PCT Filed: Aug. 16, 2016

(86) PCT No.: PCT/JP2016/073899
§ 371 (c)(1),
(2) Date: Jan. 17, 2018

(87) PCT Pub. No.: WO2017/043264
PCT Pub. Date: Mar. 16, 2017

(65) Prior Publication Data
US 2018/0213408 A1    Jul. 26, 2018

(30) Foreign Application Priority Data

Sep. 11, 2015   (JP) .................................. 2015-179402

(51) Int. Cl.
*H04W 16/14*   (2009.01)
*H04W 88/14*   (2009.01)
(Continued)

(52) U.S. Cl.
CPC ....... *H04W 16/14* (2013.01); *H04W 72/0453* (2013.01); *H04W 88/14* (2013.01);
(Continued)

(58) Field of Classification Search
None
See application file for complete search history.

(56) References Cited

U.S. PATENT DOCUMENTS

2008/0188207 A1 * 8/2008 Lee .................. H04W 8/18
455/414.1
2011/0199989 A1 * 8/2011 Wietfeldt .......... H04W 72/1215
370/329
(Continued)

FOREIGN PATENT DOCUMENTS

JP    2012-147207 A    8/2012
JP    2012-147216 A    8/2012
(Continued)

OTHER PUBLICATIONS

Furuichi, et al., "Proposal for CM discovery/selection/association as CE operation", IEEE 802.19-16/0015r0, Jan. 2016, Total 6 pages.
(Continued)

Primary Examiner — Otis L Thompson, Jr.
(74) Attorney, Agent, or Firm — Xsensus LLP

(57) ABSTRACT

[Object] To provide a communication control device capable of allowing coexistence of communication nodes in any implementation.
[Solution] Provided is the communication control device including: a transmission unit configured to transmit an acquisition request of connection information to a storage device storing the connection information for connection to a communication control determination device that controls coexistence of a plurality of wireless systems; an acquisition unit configured to acquire a response including the connection information from the storage device; and a control unit configured to select, on a basis of at least one reference, a communication control determination device from the connection information received from the storage device. The reference relates to information necessary for communication control for the coexistence.

24 Claims, 12 Drawing Sheets

(51) Int. Cl.
*H04W 72/04* (2009.01)
*H04W 8/00* (2009.01)
*H04W 24/02* (2009.01)
*H04W 72/10* (2009.01)

(52) U.S. Cl.
CPC ............ *H04W 8/005* (2013.01); *H04W 24/02* (2013.01); *H04W 72/10* (2013.01)

(56) References Cited

U.S. PATENT DOCUMENTS

| | | | | |
|---|---|---|---|---|
| 2012/0106461 | A1* | 5/2012 | Kasslin | H04W 16/14 370/329 |
| 2012/0182883 | A1 | 7/2012 | Junell et al. | |
| 2012/0195270 | A1* | 8/2012 | Kang | H04W 16/14 370/329 |
| 2012/0201208 | A1* | 8/2012 | Kang | H04W 16/14 370/329 |
| 2012/0304213 | A1* | 11/2012 | Lee | H04W 16/14 725/14 |
| 2013/0003599 | A1* | 1/2013 | Zakrzewski | H04W 48/18 370/253 |
| 2013/0023295 | A1 | 1/2013 | Kasslin et al. | |
| 2013/0157706 | A1* | 6/2013 | Jo | H04W 16/14 455/512 |
| 2013/0295947 | A1 | 11/2013 | Lee et al. | |
| 2013/0295948 | A1 | 11/2013 | Ye et al. | |
| 2013/0310061 | A1* | 11/2013 | Sawai | H04W 72/00 455/454 |
| 2014/0038657 | A1* | 2/2014 | Jo | H04W 16/14 455/509 |
| 2014/0051469 | A1* | 2/2014 | Kasslin | H04L 1/00 455/509 |
| 2014/0135048 | A1* | 5/2014 | Kasslin | H04W 24/02 455/501 |
| 2015/0016383 | A1* | 1/2015 | Kim | H04W 16/14 370/329 |
| 2015/0111596 | A1* | 4/2015 | Ruuska | H04W 16/14 455/454 |
| 2016/0088488 | A1* | 3/2016 | Kang | H04W 16/14 455/450 |
| 2016/0227418 | A1* | 8/2016 | Takekawa | H04W 16/14 |
| 2016/0338071 | A1* | 11/2016 | Khosla | H04W 72/1215 |
| 2017/0048838 | A1* | 2/2017 | Chrisikos | H04W 72/0406 |
| 2018/0262914 | A1* | 9/2018 | Furuichi | H04W 16/14 |

FOREIGN PATENT DOCUMENTS

| | | |
|---|---|---|
| JP | 2014-027602 A | 2/2014 |
| JP | 2014-135675 A | 7/2014 |
| WO | 2012/132804 A1 | 10/2012 |

OTHER PUBLICATIONS

International Search Report dated Nov. 8, 2016 in PCT/JP2016/073899 filed Aug. 16, 2016.
Sho Furuichi Et Al: "Proposal for CM discovery/selection/association as CE operation", IEEE 802.19-16/0015r0, Jan. 1, 2016 (Jan. 1, 2016), XP055368599, Retrieved from the Internet: URL:https://slideplayer.com/slide/9998774/ [retrieved on May 2, 2017] "the whole document".
European Search Report dated Jan. 14, 2019, issued in corresponding European Patent Application No. 16844127.
European Extended Search Report dated Apr. 10, 2019, issued in corresponding European Patent Application No. 16844127.
Search Report and Written Opinion issued in Singaporean Application 11201800942V dated Oct. 29, 2019.

* cited by examiner

COMMUNICATION CONTROL DEVICE, STORAGE DEVICE, COMMUNICATION CONTROL DETERMINATION DEVICE, AND SERVER DEVICE

TECHNICAL FIELD

The present disclosure relates to a communication control device, a storage device, a communication control determination device, and a server device.

BACKGROUND ART

As a countermeasure to alleviate shortage of future frequency resources, secondary usage of frequencies has been discussed. Secondary usage of frequencies means that part of or all of frequency channels allocated to a certain system with a higher priority is secondarily used by another system. Generally, a system to which a frequency channel is allocated with a higher priority is called "primary system", and a system that secondarily uses the frequency channel is called "secondary system".

TV whitespaces are an example of frequency channels that are expected to be secondarily used. TV whitespaces mean frequency channels that are allocated to a TV broadcast system serving as a primary system but are not locally used by the TV broadcast system. By allowing a secondary system to use those TV whitespaces, efficient utilization of frequency resources can be achieved. There are a plurality of standards for wireless access schemes in a physical layer (PHY) and MAC layer for enabling secondary usage of the TV whitespaces, such as IEEE802.22, IEEE802.11af, and European Computer Manufacturer Association (ECMA)-392 (CogNea).

The IEEE802.19 working group has studied smooth coexistence of a plurality of secondary systems using different wireless access schemes. For example, in the IEEE802.19 working group, functions for coexistence of secondary systems are grouped into three function entities, i.e., a coexistence manager (CM), a coexistence enabler (CE), and a coexistence discovery and information server (CDIS). The CM is a functional entity for mainly making a decision for coexistence. The CE is a functional entity serving as an interface for mediating transmission of commands and exchange of information between the CM and a secondary usage node. The CDIS is a functional entity serving as a server for centrally managing information of a plurality of secondary systems.

For example, regarding those functional entities, Patent Literature 1 cited below discloses a technology in which a plurality of functional entities perform neighbor discovery in cooperation with each other.

CITATION LIST

Patent Literature

Patent Literature 1: WO 2012/132804

DISCLOSURE OF INVENTION

Technical Problem

However, the following is not specified: to which CM a CE is to be firstly connected in a case where frequencies are secondarily used. Unless to which CM a CE is to be firstly connected is specified, information of a secondary usage node is not supplied to a system and frequencies cannot be secondarily used smoothly, regardless of how the CE is implemented.

In view of this, the present disclosure proposes a communication control device, a storage device, a communication control determination device, and a server device, each of which is new, is improved, and is capable of allowing coexistence of communication nodes in any implementation.

Solution to Problem

According to the present disclosure, there is provided a communication control device including: a transmission unit configured to transmit an acquisition request of connection information to a storage device storing the connection information for connection to a communication control determination device that controls coexistence of a plurality of wireless systems; an acquisition unit configured to acquire a response including the connection information from the storage device; and a control unit configured to select, on a basis of at least one reference, a communication control determination device from the connection information received from the storage device. The reference relates to information necessary for communication control for the coexistence.

In addition, according to the present disclosure, there is provided a storage device including: an acquisition unit configured to acquire connection information for connecting a communication control device that mediates information between a communication control determination device that controls coexistence of a plurality of wireless systems and a communication device that uses the wireless systems, to the communication control determination device; a storage unit configured to store the connection information for connection to the communication control determination device; and a control unit configured to generate, on a basis of geographical information of the communication control device and network information, connection information regarding connection to the communication control determination device recommended to be connected.

In addition, according to the present disclosure, there is provided a communication control determination device configured to control coexistence of a plurality of wireless systems, the communication control determination device including: a control unit configured to record or update, in a server device that manages information of the plurality of wireless systems, connection information for connecting a communication control device that mediates information to a communication device that uses the wireless system to the communication control determination device and provide the connection information to a storage device in response to a request from the storage device.

In addition, according to the present disclosure, there is provided a server device configured to manage information of a plurality of wireless systems, the server device including a control unit configured to acquire, from a communication control determination device that controls coexistence of the plurality of wireless systems, connection information for connecting a communication control device that mediates information to a communication device that uses the wireless system to the communication control determination device, and provide the connection information to a storage device in response to a request from the storage device.

Advantageous Effects of Invention

As described above, according to the present disclosure, it is possible to provide a communication control device, a storage device, a communication control determination device, and a server device, each of which is new, is improved, and is capable of allowing coexistence of communication nodes in any implementation.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
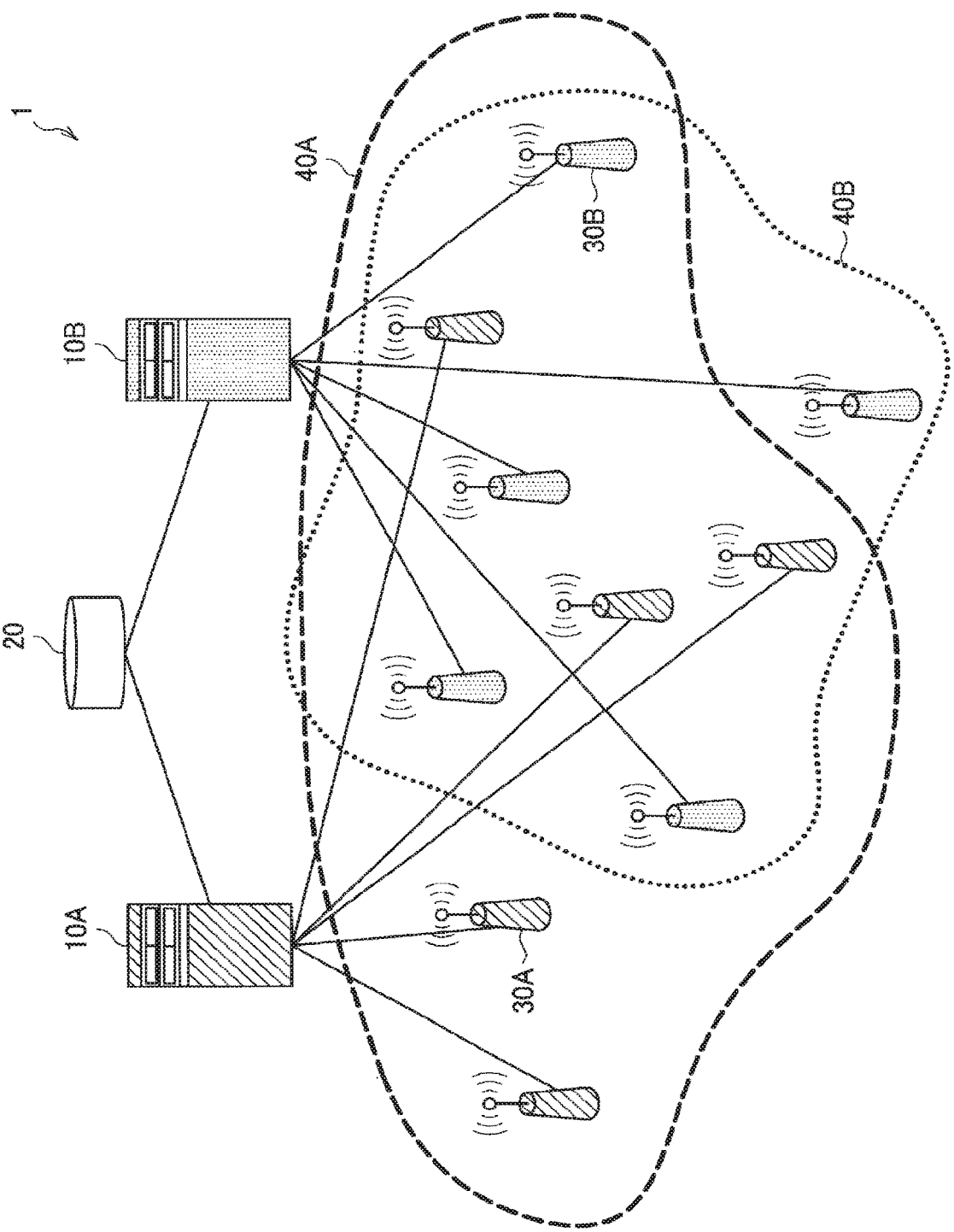
FIG. 1 is an explanatory view for describing an overview of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Embodiment of present disclosure
 1.1. Whole configuration of system
 1.2. Architecture example
 1.3. Configuration example
 1.4. Operation example
2. Conclusion 1. Embodiment of Present Disclosure

[1.1. Whole Configuration of System]

FIG. 1 is an explanatory view for describing an overview of a communication system according to an embodiment of the present disclosure.

FIG. 1 illustrates a plurality of secondary usage nodes 30A included in a secondary system A and a plurality of secondary usage nodes 30B included in a secondary system B. As illustrated in FIG. 1, the secondary usage node 30 is a transmitter station such as, typically, a base station or access point. The secondary usage nodes 30A, which are transmitter stations, provide a service of the secondary system A to a receiver station located in a service area 40A. Similarly, the secondary usage nodes 30B, which are transmitter stations, provide a service of the secondary system B to a receiver station located in a service area 40B. Hereinafter, a transmitter station and a receiver station included in a secondary system is collectively referred to as "secondary usage nodes".

The secondary usage nodes 30A and 30B are connected to communication control devices 10A and 10B, respectively. The communication control devices 10 are a device introduced to control coexistence of a plurality of secondary systems that use frequency channels allocated to a primary system. The communication control devices 10A and 10B are connected to a geo-location database (GLDB) 20. The GLDB 20 has a function of notifying each of the secondary systems of a list of available frequencies and/or transmission power and typically protects the primary system (incumbent protection). For example, the communication control device 10 obtains, from the GLDB 20, a frequency band that is allocated to the primary system and can be secondarily used and causes a secondary system to be managed and/or controlled (hereinafter, also simply be referred to as "under management") to use the frequency band.

Note that examples of the primary system encompass TV broadcast systems, program making and special events (PMSE), radars (military radar, ship-based radar, weather radar, or the like), fixed satellite services (FSS), earth exploration satellite services (EESS), and the like.

Herein, in some cases, the service areas 40 (that is, 40A and 40B) of a plurality of secondary systems geographically overlap and frequency bands used therein overlap. Specifically, for example, there is a case where an area where a long term evolution (LTE) service is provided and an area where a Wi-Fi service is provided, which are operated by different operators, overlap.

In the present embodiment, it is expected that, in such a situation, a part or all of a frequency band allocated to a primary system is secondarily used by one or more secondary systems in cooperation with each other. To achieve this, it is desirable that information can be smoothly exchanged between a plurality of secondary systems.

Figure 2:
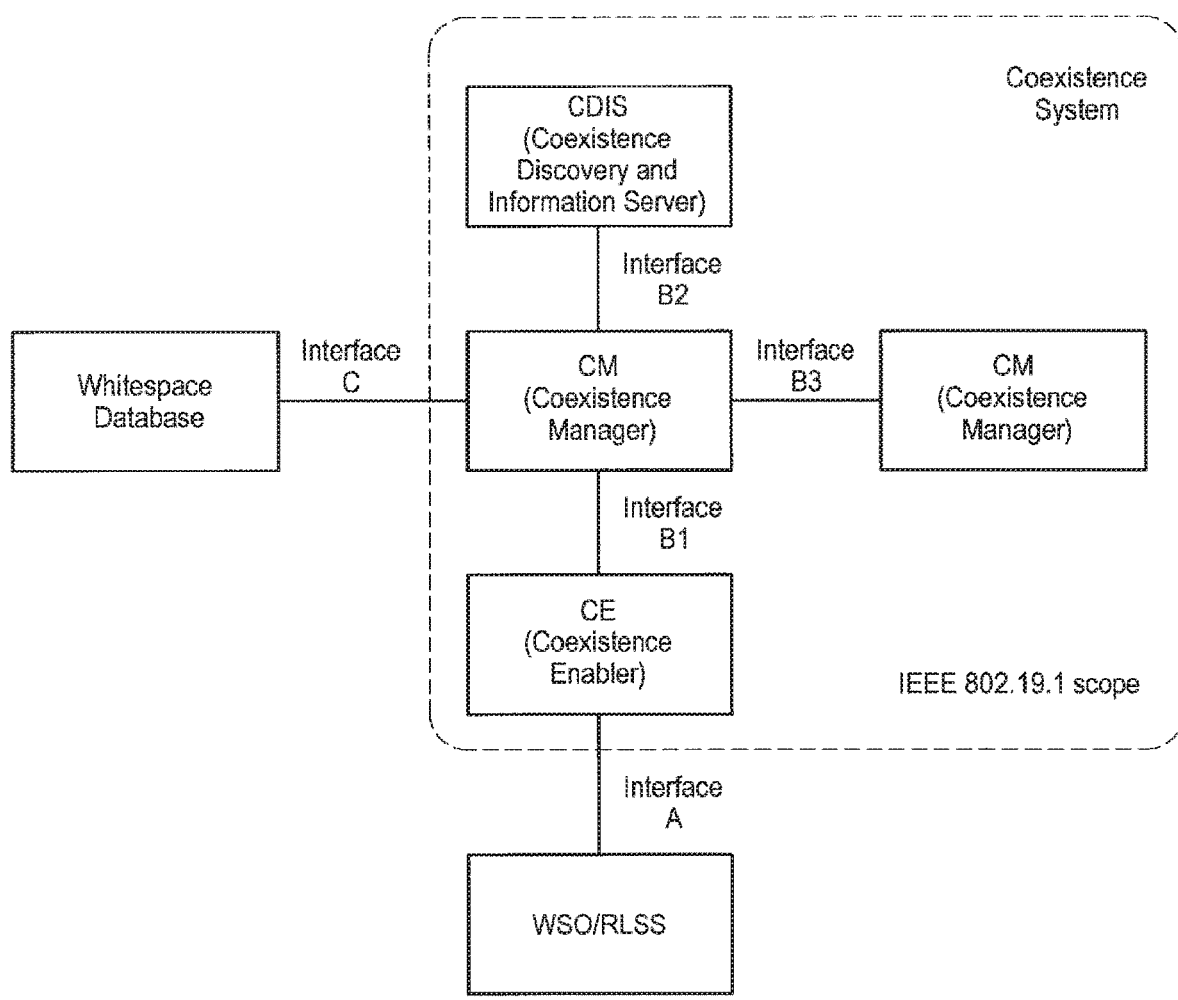
FIG. 2 is an explanatory view illustrating a correlation between three functional entities for assistance in coexistence.

FIG. 2 is an explanatory view illustrating a correlation between three functional entities for assistance in coexistence. As illustrated in FIG. 2, in IEEE802.19.1, functions for assistance in coexistence of secondary systems are grouped into three functional entities, i.e., a CM, a CE, and a CDIS.

(1) Coexistence Manager (CM)

A CM is a functional entity for performing making a decision for coexistence. The CM acquires information regarding a primary system, information regarding an available channel, and information regarding a secondary system. The CM acquires information from a CDIS, another CM, a secondary usage node (accessed via a CE), and the like. Based on those pieces of information, the CM determines which frequency channel is to be used by a secondary usage node under management of the CM itself in order to operate a secondary system. For each secondary usage node, the CM may further determine additional control parameters such as maximum transmission power, a recommended wireless access scheme, and an update cycle of location data. Then, the CM causes each secondary usage node to operate or reconfigure a secondary system in accordance with the determined parameters.

(2) Coexistence Enabler (CE)

A CE is a functional entity serving as an interface for mediating transmission of a command and exchange of information between a CM and a secondary usage node. For example, the CE converts information possessed by the secondary usage node into a form usable by the CM and transmits the converted information to the CM. Further, the CE converts a command of coexistence of secondary systems from the CM into a form executable by the secondary usage node and transmits the converted command to the secondary usage node.

(3) Coexistence Discovery and Information Server (CDIS)

A CDIS is a functional entity serving as a server for managing information of a plurality of secondary systems. For example, the CDIS collects information regarding a secondary system from each secondary usage node via a CE and a CM. Further, the CDIS collects, from the GLDB 20, information regarding a primary system and information regarding an available channel. Then, the CDIS accumulates the collected information in a database. The information accumulated by the CDIS is used in a case where the CM makes a decision for coexistence. The CDIS may select a master CM (CM that controls a plurality of CMs and makes a decision in a centralized manner) from a plurality of CMs. Further, the CDIS has a neighbor discovery function of detecting neighbor secondary systems that may interfere with each other.

At least one of the above three-types of functional entities is implemented in each of the communication control devices 10 illustrated in FIG. 1. Note that part of the functional entities may be implemented in each secondary usage node 30. Further, part of the functional entities may be implemented in the same device as the GLDB 20.

Note that the above three-types of functional entities will also be collectively referred to as "coexistence system". The coexistence system assists in coexistence of secondary systems under management thereof.

(4) Whitespace Object (WSO)

The WSO is one of secondary usage nodes. In IEEE Std 802.19.1-2014, the WSO indicates a television whitespace (TVWS) device or a network of TVWS devices. In the present embodiment, the WSO is not limited to the TVWS device or the network of the TVWS devices and indicates any secondary usage node or any network of secondary systems. The WSO is connected to a CM via a CE in order to receive a coexistence service that is a service for coexistence of secondary systems. Note that the WSO is a kind of communication node.

(5) Registered Location Secure Server (RLSS)

An RLSS is a local server for preventing interference between terminals. The WSO is connected to the GLDB 20 via the RLSS. The RLSS is specified in IEEE Std 802.11af that is one of standards for providing a wireless access scheme for TVWSs. In IEEE Std 802.19.1-2014, the RLSS is an entity that stores information organized by using a geographical location, accesses a database storing operation parameters and locations for one or a plurality of basic service sets, and manages the database.

Hereinabove, details of each of the functional entities have been described. The functional entities can exchange information with each other by using an interface. As illustrated in FIG. 2, the CE and the WSO/RLSS can exchange information via an interface A. The CM and the CE can exchange information via an interface B1. The CM and the CDIS can exchange information via an interface B2. The CMs can exchange information via an interface B3. The CM and a whitespace database can exchange information via an interface C. Note that the CE and the WSO/RLSS may be implemented in the same device.

Figure 3:
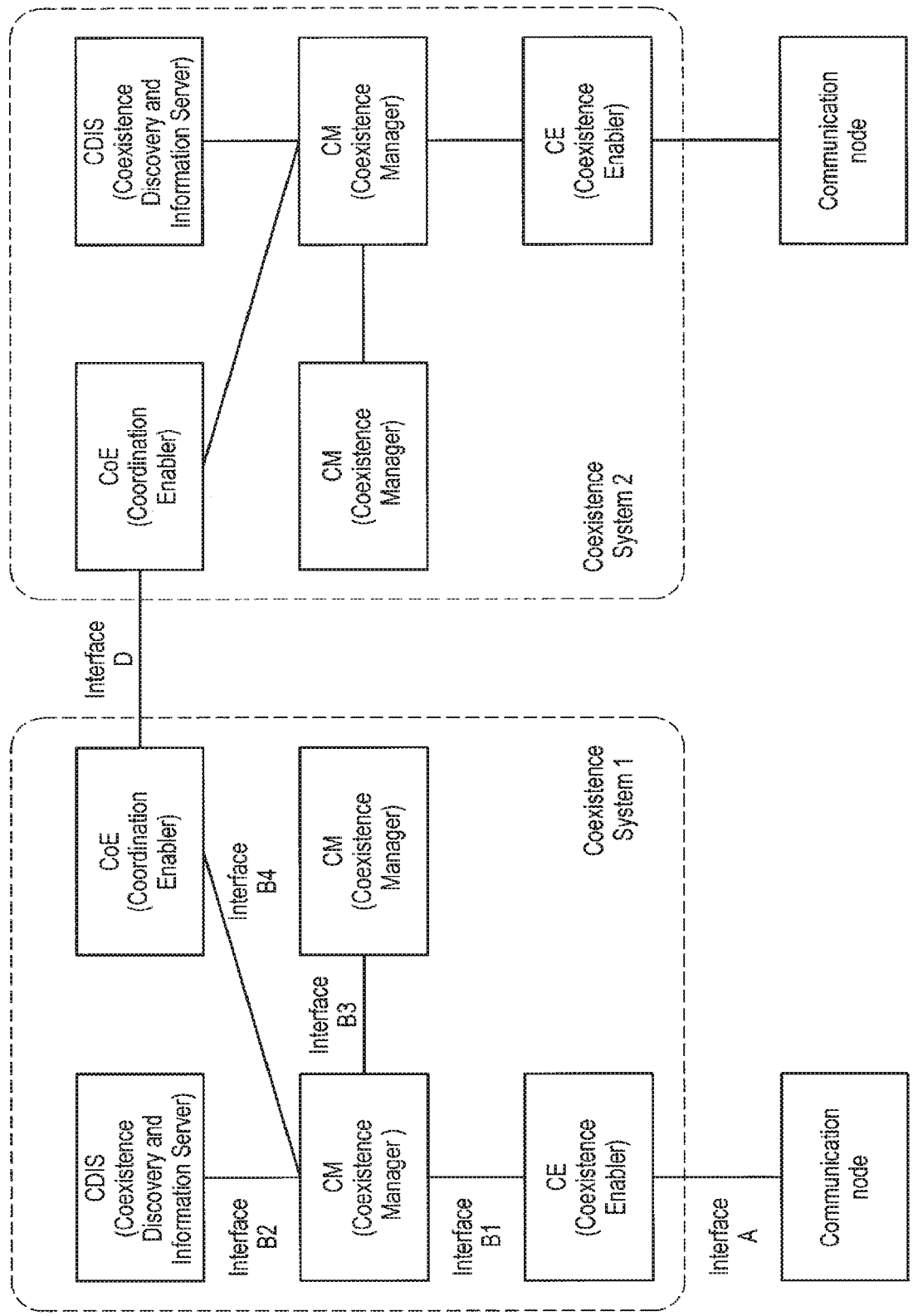
FIG. 3 is an diagram illustrating four functional entities for assistance in coexistence.

FIG. 3 is a view for describing four functional entities for assistance in coexistence. As illustrated in FIG. 3, a coordination enabler (CoE) may be introduced into a coexistence system. This entity exchanges information with a coexistence system whose manager is different or an entity existing outside. The CoE may be implemented in the communication control device 10 illustrated in FIG. 1, may be implemented in each secondary usage node 30, may be implemented in the same device as the GLDB 20, or may be implemented in any other arbitrary devices. Note that an interface may be provided between the GLDB and the CM as in FIG. 2.

IEEE Std 802.19.1-2014 specifies a subscription request procedure as a procedure to be firstly implemented in the communication system including such functional entities. However, this procedure is performed on the premise that a CE is served to some CM. A procedure for allowing a CE to be served to a CM, that is, a method of initial connection to a CM is not specified in IEEE Std 802.19.1-2014.

In a case where the CE is managed by the same manager as a manager of a CM or CDIS from the beginning, a procedure for initial connection to the CM is unnecessary. However, depending on implementation, it is expected that the CE is implemented in a communication node, and it is also expected that a communication node in which the CE is implemented is commercially available as is the case of a wireless LAN access point. In a case where the CE is implemented in the communication node, it is more preferable to provide a mechanism capable of connecting the CE to various CMs or CDISs regardless of how the CE is implemented, as compared to a case where the CE and the CM/CDIS are associated from the beginning.

In a case where there is no mechanism for initial connection to the CM, information of the communication node (e.g., WSO) is not appropriately supplied to the system, and therefore it may be difficult for the CE to achieve coexistence of communication nodes. Further, the procedure for initial connection to the CM needs to be prepared in a case where the communication node has mobility or in consideration of mutual compatibility.

In view of this, a disclosing party of the present application has diligently studied a mechanism capable of connecting a CE to various CMs or CDISs regardless of how the CE is implemented. As a result, the disclosing party of the present application has devised a mechanism capable of, regardless of how the CE is implemented, connecting the CE to various CMs or CDISs by providing a database storing information of a CM, connecting the CE to the database, and acquiring the information of the CM.

[1.2. Architecture Example]

In the present embodiment, a database storing information of a CM is provided and a CE is connected to the database to thereby acquire the information of the CM. In view of this, hereinafter, architecture examples expected in the present embodiment will be described.

FIGS. 4A to 4D are explanatory views illustrating architecture examples expected in the present embodiment. In any example, a database storing information of a CM is provided. This database is referred to as "CM list database" in the present embodiment. Further, it does not matter whether interfaces are provided only in a wired manner or or via a wireless section.

Figure 4A:
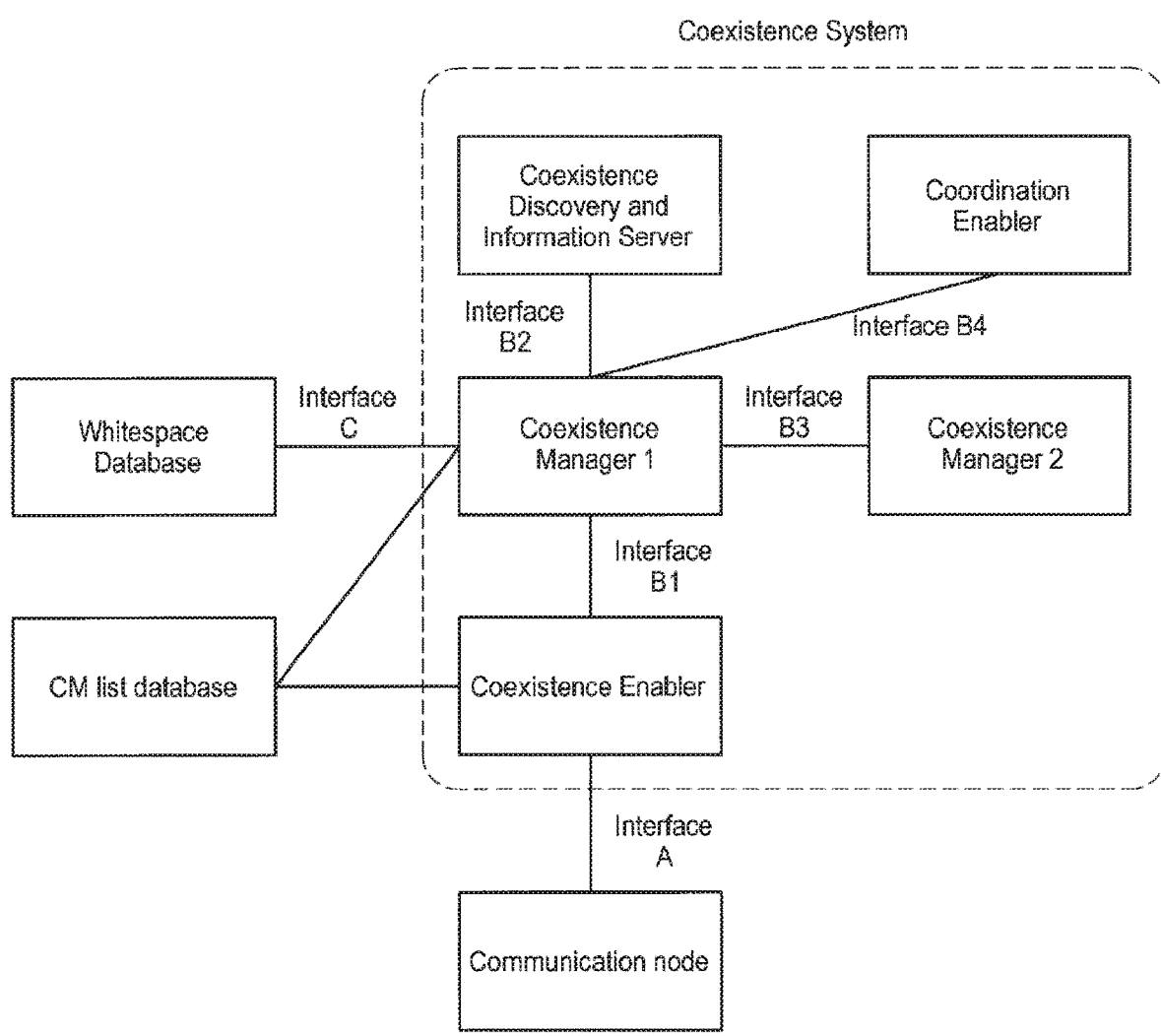
FIG. 4A is an explanatory view illustrating an architecture example expected in the present embodiment.
Figure 4B:
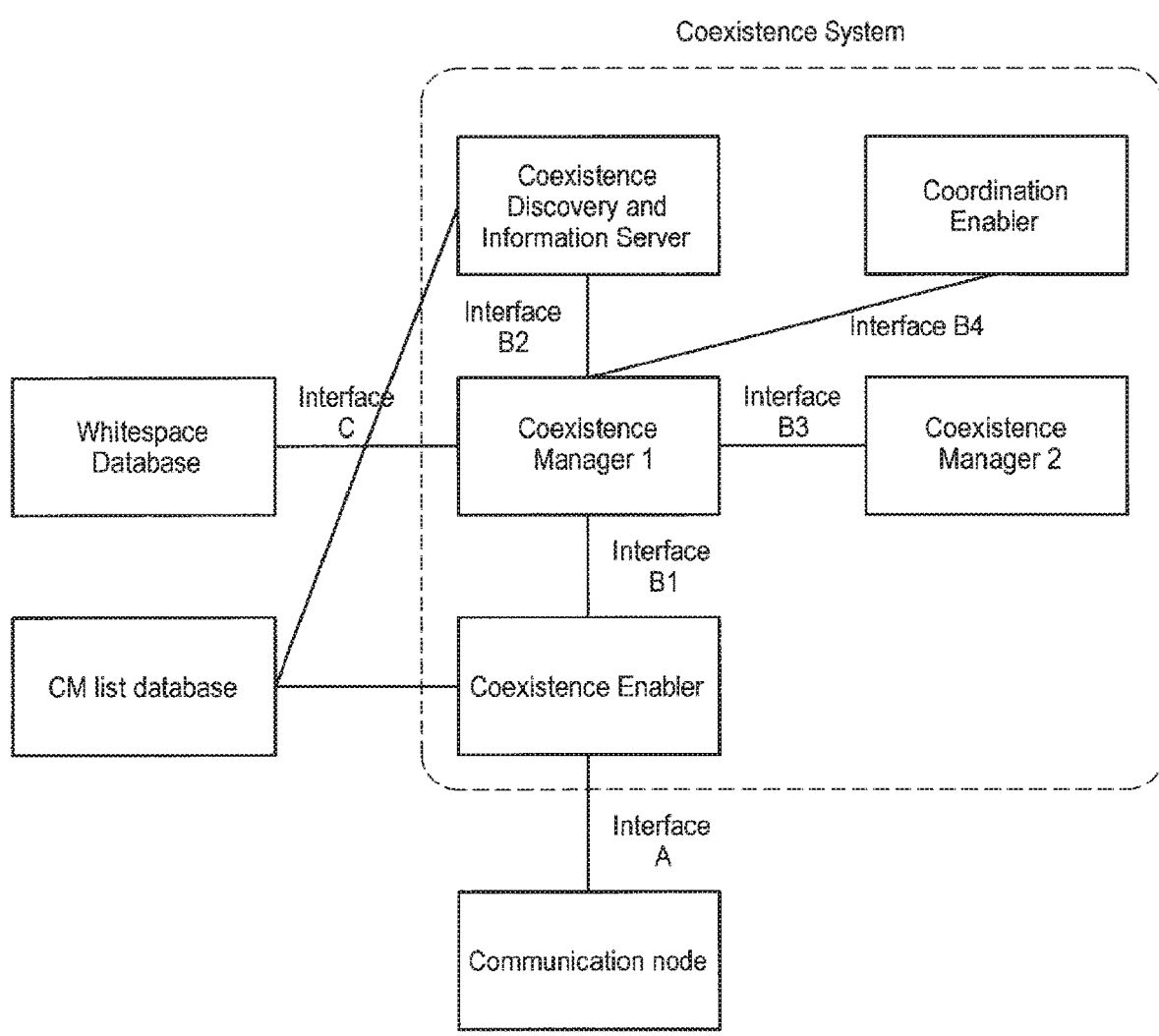
FIG. 4B is an explanatory view illustrating an architecture example expected in the present embodiment.
Figure 4C:
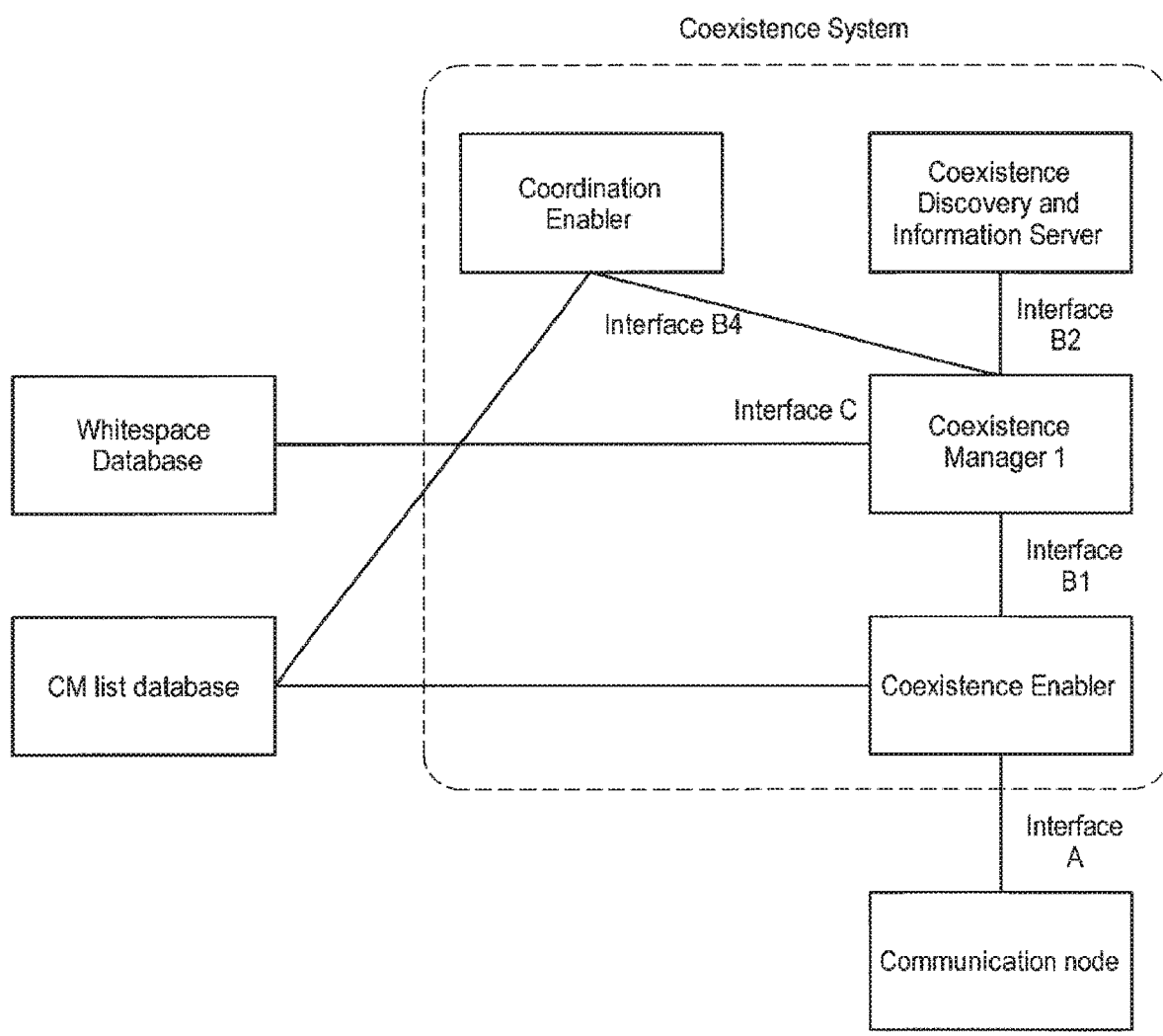
FIG. 4C is an explanatory view illustrating an architecture example expected in the present embodiment.

FIG. 4A is an explanatory view illustrating an architecture example where a CE and a CM are connected to a CM list database via interfaces. FIG. 4B is an explanatory view illustrating an architecture example where a CE and a CDIS are connected to a CM list database via interfaces. FIG. 4C is an explanatory view illustrating an architecture example where a CE and a CoE are connected to a CM list database via interfaces.

The architecture examples illustrated in FIGS. 4A to 4C are architecture examples where the CM list database acquires information regarding connection to a CM via any one of entities included in the system. The example in FIG. 4A is an architecture example where the CM list database acquires information regarding connection to a CM from the CM. The example in FIG. 4B is an architecture example where the CM list database acquires information regarding connection to a CM from the CDIS. The example in FIG. 4C is an architecture example where the CM list database acquires information regarding connection to a CM from the CoE. Such architectures are useful in a case where the information regarding connection to the CM is regularly or irregularly changed, in a case where the CE automatically acquires the information regarding connection to the CM in a situation in which managers or operators of a plurality of coexistence systems are different, and other cases.

Figure 4D:
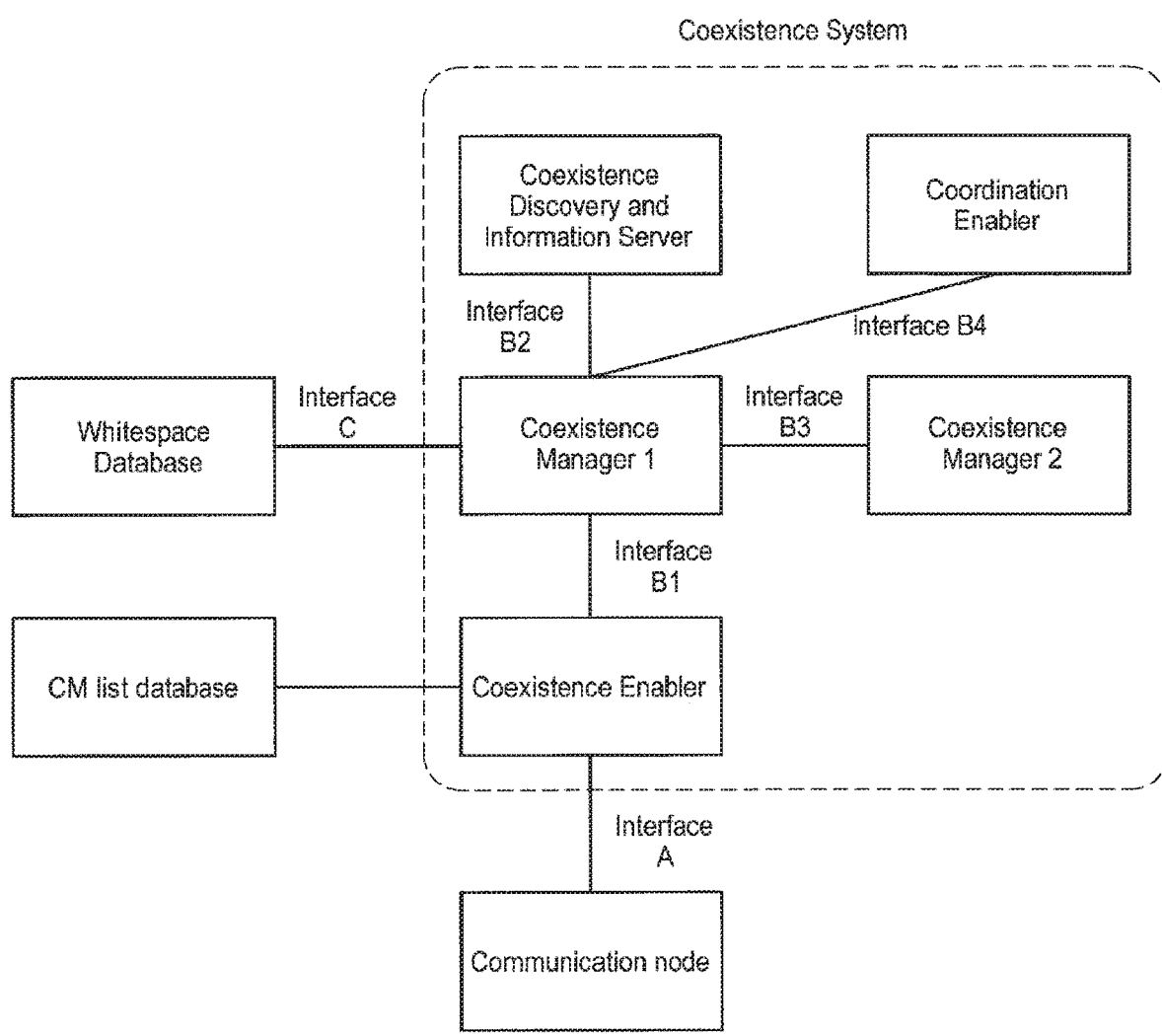
FIG. 4D is an explanatory view illustrating an architecture example expected in the present embodiment.

The architecture example illustrated in FIG. 4D is an architecture example where none of the entities (CE, CDIS, and CoE) included in the system is connected to the CM list database via an interface. The architecture example illustrated in FIG. 4D is useful in a case where, for example, information regarding connection to a CM is already known, such as a case where a manager or operator of the coexistence system possesses his/her own CM list database, and the CM list database can be caused to store the connection information in advance.

The present embodiment is intended to cause the CE to acquire information regarding connection to a CM (CM discovery), and therefore the form of the CM list database may be any one of the architectures in FIGS. 4A to 4D.

Note that the CE is an example of a communication control device of the present disclosure, the CM is an example of a communication control determination device of the present disclosure, the CDIS is an example of a server device of the present disclosure, and the CM list database is an example of a storage device of the present disclosure.

[1.3. Configuration Example]

Next, respective functional configuration examples of the CE, the CM, the CDIS, and the CM list database will be described.

Figure 5:
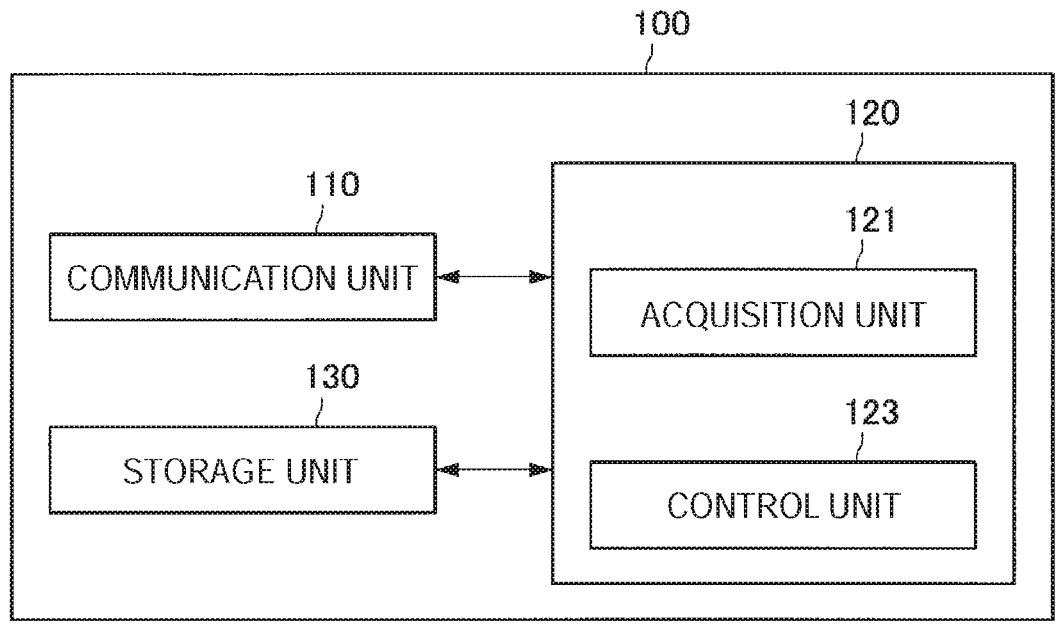
FIG. 5 is an explanatory view illustrating a functional configuration example of a device 100 that can function as a CE.

FIG. 5 is an explanatory view illustrating a functional configuration example of a device 100 that can function as the CE. As illustrated in FIG. 5, the device 100 includes a communication unit 110, a processing unit 120, and a storage unit 130. Further, the processing unit 120 includes an acquisition unit 121 and a control unit 123.

The communication unit 110 performs communication of information with another device. The communication unit 110 can, for example, include an antenna in a case of wireless communication and include an interface for wired communication in a case of wired communication. Further, the communication unit 110 can include a communication circuit for communication processing of information. The communication unit 110 transmits information received from another device to the processing unit 120.

The processing unit 120 is made up of, for example, a central processing unit (CPU), a read only memory (ROM), a random access memory (RAM), and the like and provides various functions of the device 100. Note that the processing unit 120 can further include a constituent element in addition to the acquisition unit 121 and the control unit 123. That is, the processing unit 120 can also perform operation in addition to operation of the acquisition unit 121 and the control unit 123.

The acquisition unit 121 acquires various kinds of information that the communication unit 110 receives from another device.

The control unit 123 controls operation of the device 100. In a case where the control unit 123 controls operation of the device 100, the control unit 123 can use information acquired by the acquisition unit 121 and information stored on the storage unit 130.

In the present embodiment, the communication unit 110 of the device 100 that can function as the CE transmits, on the basis of control by the control unit 123, a request for information regarding connection to a CM to the device 400 that can function as the CM list database described below. The acquisition unit 121 of the device 100 that can function as the CE acquires, from the device 400, a response including the information regarding connection to the CM. The control unit 123 of the device 100 that can function as the CE selects, on the basis of at least one reference, a CM from the response including the information regarding connection to the CM received from the device 400. The reference is, for example, a reference regarding information necessary for communication control for coexistence of secondary systems (example of a plurality of wireless systems in the present disclosure) which secondarily use a frequency band.

The storage unit 130 is made up of, for example, an HDD, an SSD, a flash memory, and other another storage media and stores various kinds of information.

Figure 6:
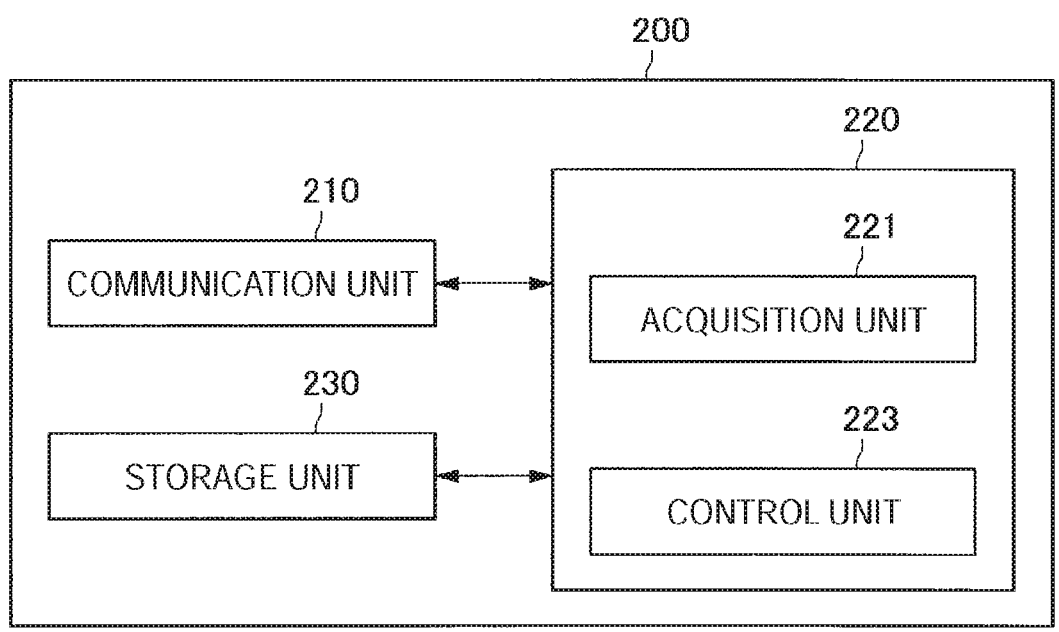
FIG. 6 is an explanatory view illustrating a functional configuration example of a device 200 that can function as a CM.

FIG. 6 is an explanatory view illustrating a functional configuration example of the device 200 that can function as the CM. As illustrated in FIG. 6, the device 200 includes a communication unit 210, a processing unit 220, and a storage unit 230. Further, the processing unit 220 includes an acquisition unit 221 and a control unit 223.

The communication unit 210 performs communication of information with another device. The communication unit 210 can, for example, include an antenna in a case of wireless communication and include an interface for wired communication in a case of wired communication. Further, the communication unit 210 can include a communication circuit for communication processing of information. The communication unit 210 transmits information received from another device to the processing unit 220.

The processing unit 220 is made up of, for example, a CPU, a ROM, a RAM, and the like and provides various functions of the device 200. Note that the processing unit 220 can further include a constituent element in addition to the acquisition unit 221 and the control unit 223. That is, the processing unit 220 can also perform operation in addition to operation of the acquisition unit 221 and the control unit 223.

The acquisition unit 221 acquires various kinds of information that the communication unit 210 receives from another device.

The control unit 223 controls operation of the device 200. In a case where the control unit 223 controls operation of the device 200, the control unit 223 can use information acquired by the acquisition unit 221 and information stored on the storage unit 230.

In the present embodiment, the control unit 223 of the device 200 that can function as the CM records or updates, in the device 300 that can function as the CDIS, connection information for connecting the device 100 that can function as the CE to the CM. Further, the control unit 223 of the device 200 that can function as the CM supplies the connection information to the device 400 in response to a request from the device 400 that can function as the CM list database.

The storage unit 230 is made up of, for example, an HDD, an SSD, a flash memory, and other another storage media and stores various kinds of information.

Figure 7:
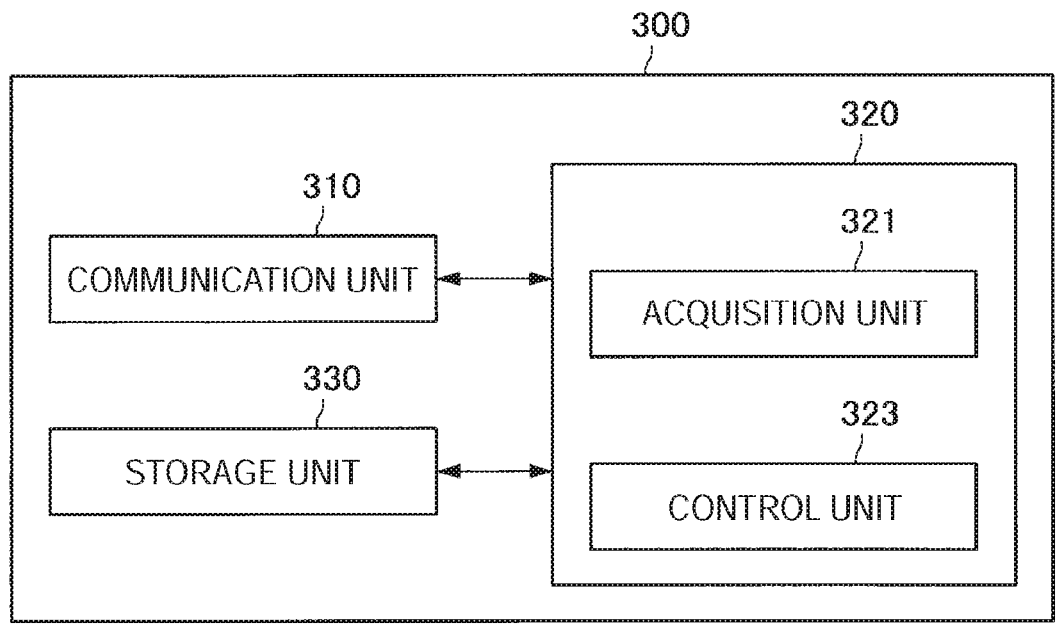
FIG. 7 is an explanatory view illustrating a functional configuration example of a device 300 that can function as a CDIS.

FIG. 7 is an explanatory view illustrating a functional configuration example of the device 300 that can function as the CDIS. As illustrated in FIG. 7, the device 300 includes a communication unit 310, a processing unit 320, and a storage unit 330. Further, the processing unit 320 includes an acquisition unit 321 and a control unit 323.

The communication unit 310 performs communication of information with another device. The communication unit 310 can, for example, include an antenna in a case of wireless communication and include an interface for wired communication in a case of wired communication. Further, the communication unit 310 can include a communication circuit for communication processing of information. The communication unit 310 transmits information received from another device to the processing unit 320.

The processing unit 320 is made up of, for example, a CPU, a ROM, a RAM, and the like and provides various functions of the device 300. Note that the processing unit 320 can further include a constituent element in addition to the acquisition unit 321 and the control unit 323. That is, the processing unit 320 can also perform operation in addition to operation of the acquisition unit 321 and the control unit 323.

The acquisition unit 321 acquires various kinds of information that the communication unit 310 receives from another device.

The control unit 323 controls operation of the device 300. In a case where the control unit 323 controls operation of the device 300, the control unit 323 can use information acquired by the acquisition unit 321 and information stored on the storage unit 330.

In the present embodiment, the control unit 323 of the device 300 that can function as the CDIS acquires connection information for connecting the CE to the CM from the CM and supplies the acquired connection information to the device 400 in response to a request from the device 400 that can function as the CM list database.

The storage unit 330 is made up of, for example, an HDD, an SSD, a flash memory, and other another storage media and stores various kinds of information.

Figure 8:
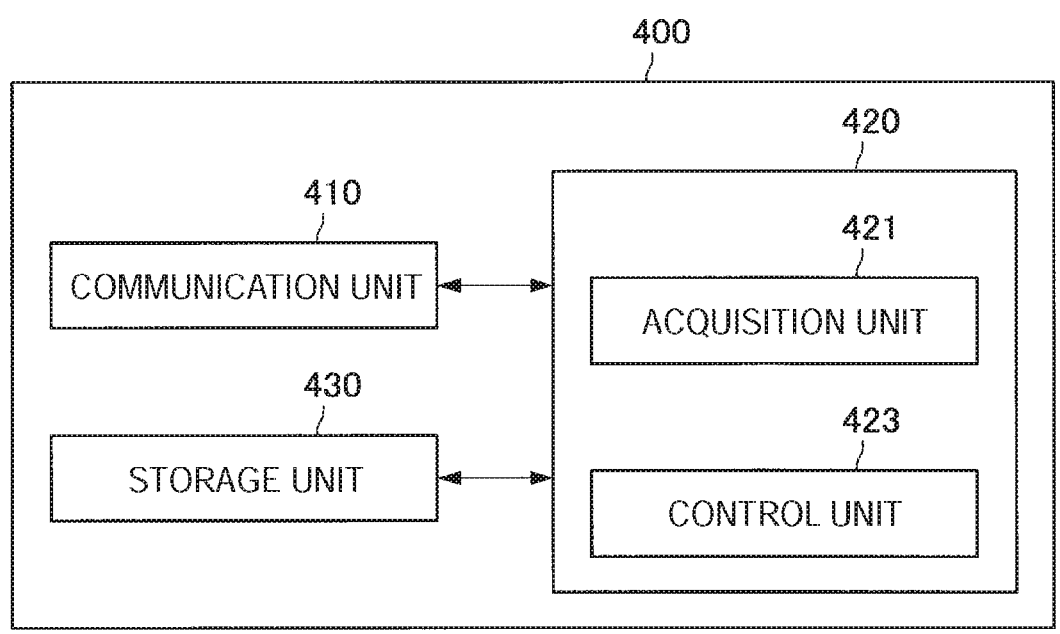
FIG. 8 is an explanatory view illustrating a functional configuration example of a device 400 that can function as a CM list database.

FIG. 8 is an explanatory view illustrating a functional configuration example of the device 400 that can function as the CM list database. As illustrated in FIG. 8, the device 400 includes a communication unit 410, a processing unit 420, and a storage unit 430. Further, the processing unit 420 includes an acquisition unit 421 and a control unit 423.

The communication unit 410 performs communication of information with another device. The communication unit 410 can, for example, include an antenna in a case of wireless communication and include an interface for wired communication in a case of wired communication. Further, the communication unit 410 can include a communication circuit for communication processing of information. The communication unit 410 transmits information received from another device to the processing unit 420.

The processing unit 420 is made up of, for example, a CPU, a ROM, a RAM, and the like and provides various functions of the device 400. Note that the processing unit 420 can further include a constituent element in addition to the acquisition unit 421 and the control unit 423. That is, the processing unit 420 can also perform operation in addition to operation of the acquisition unit 421 and the control unit 423.

The acquisition unit 421 acquires various kinds of information that the communication unit 410 receives from another device.

The control unit 423 controls operation of the device 400. In a case where the control unit 423 controls operation of the device 400, the control unit 423 can use information acquired by the acquisition unit 421 and information stored on the storage unit 430.

The storage unit 430 is made up of, for example, an HDD, an SSD, a flash memory, and other another storage media and stores various kinds of information.

In the present embodiment, the acquisition unit 421 of the device 400 that can function as the CM list database acquires connection information for connecting the CE to the CM from the CM or CDIS. The storage unit 430 of the device 400 stores the acquired connection information. Then, the control unit 423 of the device 400 generates, on the basis of geographical information of the CE and network information, information regarding connection to the CM to which the CE is recommended to be connected.

[1.4. Operation Example]

Next, an operation example of each entity of the present embodiment will be described. Hereinbelow, description will be provided by assuming that each of the entities illustrated in FIGS. 4A to 4D executes operation, instead of each device described above. However, actually, each device that can function as each entity described above may execute operation described below.

Figure 9:
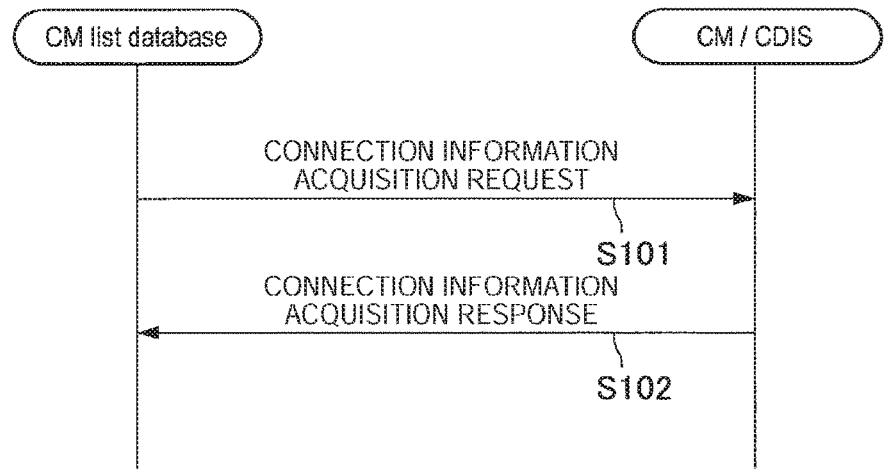
FIG. 9 is a sequence diagram illustrating an operation example of a CM list database and a CM or CDIS.

First, an operation example where the CM list database acquires information regarding connection to each CM will be described. FIG. 9 is a sequence diagram illustrating an operation example of the CM list database and the CM or CDIS. FIG. 9 illustrates a sequence diagram in which, in the architecture illustrated in FIG. 4A or 4B, the CM list database acquires information regarding connection to the CM from the CM or CDIS.

The CM list database acquires information regarding connection to each CM from the CM or CDIS in advance. To achieve this, the CM list database transmits a connection information acquisition request to the CM or CDIS (Step S101). In response to the connection information acquisition request, the CM or CDIS transmits a connection information acquisition response to the CM list database (Step S102).

Figure 10:
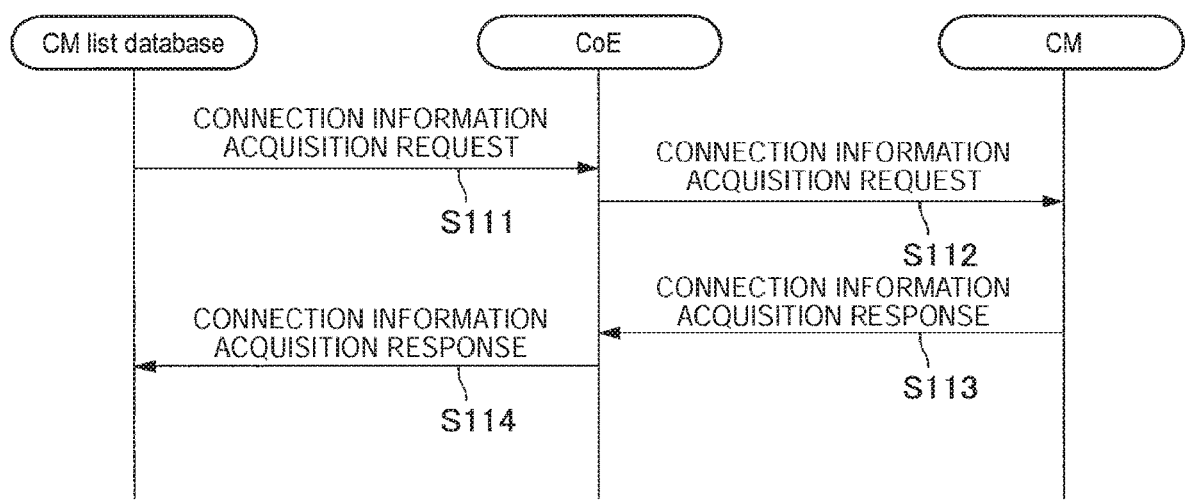
FIG. 10 is a sequence diagram illustrating an operation example of a CM list database, a CoE, and a CM.

FIG. 10 is a sequence diagram illustrating an operation example of the CM list database, the CoE, and the CM. FIG. 10 illustrates a sequence diagram in which, in the architecture illustrated in FIG. 4C, the CM list database acquires information regarding connection to the CM via the CoE.

The CM list database acquires information regarding connection to each CM from the CM in advance. To achieve this, the CM list database transmits a connection information acquisition request to the CoE (Step S111). The CoE transfers the connection information acquisition request transmitted from the CM list database to the CM (Step S112). In response to the connection information acquisition request, the CM transmits a connection information acquisition response to the CoE (Step S113). The CoE transfers the connection information acquisition response transmitted from the CM to the CM list database (Step S114)

The CM list database may cause a message of the connection information acquisition request to include any information. For example, in a case where information regarding connection to the CM for determining communication usage control in a specified geographical region is to be acquired, the CM list database may provide a notification of information regarding the geographical region. Alternatively, for example, in a case where information regarding connection to the CM is to be acquired while a coexistence profile or a coexistence service to be provided (which indicates an information service or management service) is being limited, the CM list database may provide a notification of an identifier capable of specifying the coexistence profile or the coexistence service to be provided.

The connection information acquisition response can include at least an ID and IP address of the CM. In a case where a plurality of CMs exist, the connection information acquisition response can include a list of IDs and IP addresses. The connection information acquisition response may further include an identifier capable of specifying a coexistence profile implemented in the CM or a providable coexistence service. The connection information acquisition response may also include information regarding a geographical region managed by the CM and the like. The connection information acquisition response may also include information regarding a communication carrier who manages or operates the CM.

The connection information acquisition response may also include information such as priority of connection to the CM. The priority of connection to the CM can be changed depending on a timing at which the CM list database transmits a connection information acquisition request. The priority of connection to the CM can be changed depending on, for example, the number of CEs connected to the CM. In a case where the number of CEs connected to the CM is small, the priority of connection may become higher, and, in a case where the number of CEs connected to the CM is not large, the priority of connection may become lower. Further, the priority of connection to the CM can be changed depending on, for example, a calculation load of the CM. In a case where the calculation load of the CM is small, the priority of connection may become higher, and, in a case where the calculation load of the CM is increased, the priority of connection may become lower. Further, the priority of connection to the CM can be changed depending on, for example, a contract of a user who has the CE or an access scheme between the CE and the CM. As a matter of course, the priority of connection to the CM can also be changed depending on other factors.

The identifier capable of specifying a providable coexistence service may be, for example, the following class information.

CM Class 1: to provide both an information service and a management service
CM Class 2: to provide only a management service
CM Class 3: to provide only an information service In any form, the CM list database acquiring information regarding a coexistence profile, a coexistence service to be provided, or the like as the connection information has a merit of reducing an interaction between the CE and the CM afterward.

Next, a procedure in which the CE acquires information regarding connection to a CM will be described. In the following example, description will be provided by assuming that the CE has information (IP address, port number, and the like) for connection to the CM list database in advance.

Figure 11:
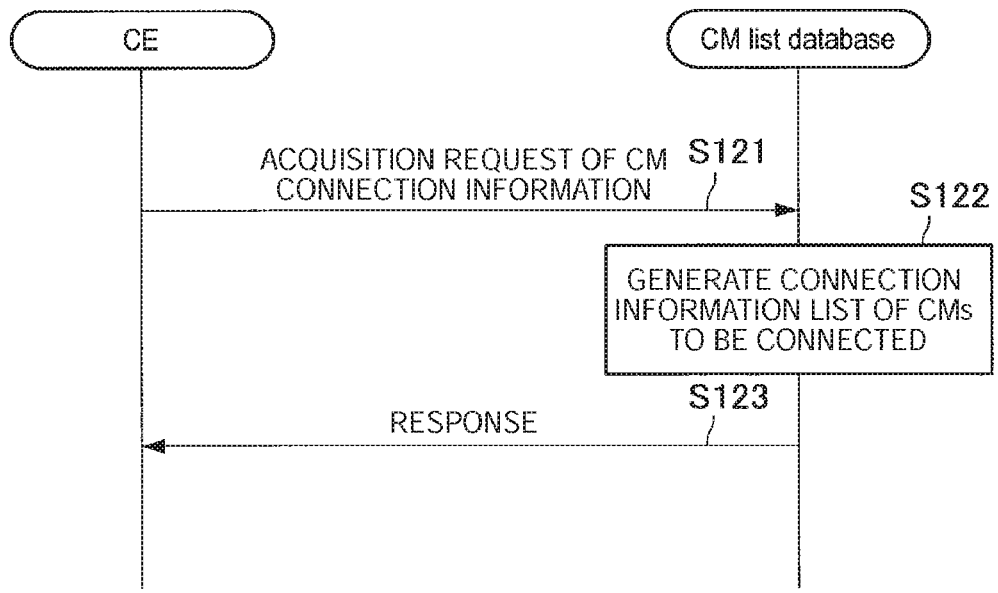
FIG. 11 is a sequence diagram illustrating an operation example of a CE and a CM list database.

FIG. 11 is a sequence diagram illustrating an operation example of the CE and the CM list database. FIG. 11 is a sequence diagram in which the CE acquires information regarding connection to a CM from the CM list database.

In order to acquire information regarding connection to a CM, the CE transmits an acquisition request of the information regarding connection to the CM to the CM list database (Step S121). When the CM list database receives the acquisition request from the CE, the CM list database generates a connection information list of CMs recommended to the CE (Step S122). Then, when the CM list database generates the connection information list of CMs, the CM list database transmits, to the CE, a message including the connection information list as a response (Step S123).

The CE may cause a message of the acquisition request of the CM connection information to include, for example, an ID of the CE, geographical location information of a communication node including the CE, information regarding a coexistence profile possessed by the CE, information regarding a communication carrier who provides an Internet service to a communication node, information regarding a wireless communication system possessed by a communication node served by the CE, and the like. Further, the CE may cause a message of the acquisition request of the CM connection information to include an identifier indicating a desired coexistence service.

The CM list database causes the response to the CE to include at least information regarding connection to a CM recommended to the CE. The information regarding connection to the CM can include an ID of the CM and an IP address of the CM. In a case where the information regarding connection to the CM includes information of a plurality of CMs, the CM list database supplies information regarding connection to CMs as a list.

The CM list database may cause the information regarding connection to the recommended CM to further include an identifier capable of specifying a coexistence profile possessed by the CM or a coexistence service to be provided. The identifier capable of specifying the providable coexistence service may be, for example, the above class information. In a case where the CM list database supplies the information regarding connection to the CMs as a list, the CM list database may cause the list to include information such as priority of connection.

The CM list database can use various references in generation of a connection information list of recommended CMs. For example, the references are as below. The CM list database may use those references alone or may simultaneously use a plurality of references. In a case where the CM list database uses a plurality of conditions, the CM list database may generate the union of CMs that satisfy each condition as a list or may generate information of CMs that satisfy all the conditions as a list. As a matter of course, the CM list database may use a selection reference other than the following references.

TABLE 1

(Examples of references for generating connection information list of CMs)

| Information included in acquisition request of CM connection information | Reference |
| --- | --- |
| Geographical location information of a communication node including the CE | To include information of a CM that performs communication usage control in the geographical region |
| Information regarding a coexistence profile possessed by the CE | To include information of a CM including the coexistence profile |
| Information regarding a communication carrier who provides an Internet service to a communication node | To include information of a CM managed/operated by the same communication carrier |
| Identifier indicating a desired coexistence service | To include information of a CM capable of providing the coexistence service |

Figure 12:
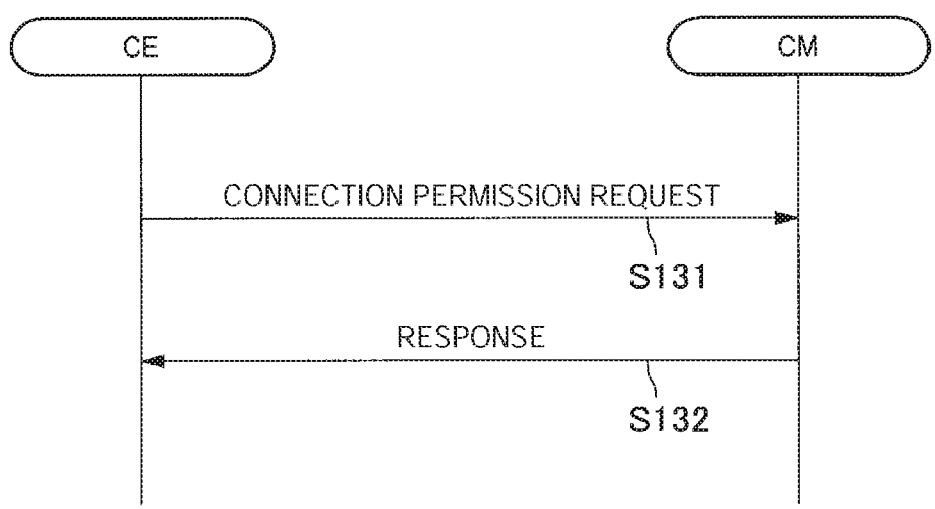
FIG. 12 is a sequence diagram illustrating an operation example of a CE and a CM.

Next, a procedure for initially connecting the CE to the CM will be described. FIG. 12 is a sequence diagram illustrating an operation example of the CE and the CM. FIG. 12 illustrates a sequence diagram in which the CE is initially connected to the CM.

The CE is initially connected to the CM by using information regarding connection to the CM transmitted from the CM list database. In a case where information regarding connection to a plurality of CMs is transmitted, the CE selects a CM therefrom on the basis of a reference regarding information necessary for communication control for coexistence and is initially connected to the CM by using information regarding connection to the CM. As the reference, for example, the CE may select, as a CM to be initially connected, a CM having the same coexistence profile. Further, for example, the CE may select, as a CM to be initially connected, a CM that provides a coexistence service desired by a communication node served by the own device. In a case where, for example, information from the CM list database includes information such as priority of connection, the CE may select a CM having a higher priority of connection. Further, the CE may select, for example, a CM that satisfies the most conditions on the basis of information included in an acquisition request of connection information. As a matter of course, the CE may use a selection reference other than the above references.

The CE transmits a connection permission request to the CM (Step S131). When the CM receives the connection permission request from the CE, the CM returns a response to the request to the CM (Step S132).

The CE may cause the connection permission request to include an ID of a communication node served by the CE, geographical location information of the communication node, an ID and IP address of the CE, and the like. Further, the CM causes the response to the CE to include at least an identifier indicating connection permission or connection rejection.

In a case where the identifier indicates connection permission, the CM may cause the response to further include initial setting information. The initial setting information may include, for example, information regarding the CM that the CE does not have, is not directly related to a coexistence service, but is necessary for maintaining the service, such as a communication connection setting (regarding HTTP), and other pieces of information. Further, in a case where the identifier indicates connection rejection, the CE selects another CM and performs a connection permission request procedure with respect to the selected CM again.

In a case where the identifier indicates connection rejection, the CM may cause the response to further include an identifier indicating a reason for rejecting connection. The identifier indicating a reason for rejecting connection may be, for example, an error code. The error code may indicate, for example, the following reasons: connection cannot be completed because of timeout; connection cannot be achieved because a load of a CM is high; connection cannot be achieved because the CE does not satisfy a requirement; and other reasons.

In a case where the information regarding connection to the CM transmitted from the CM list database is in the form of a list and connection is rejected by all CMs included in the list, the CE may transmit an acquisition request of CM connection information to the CM list database again and acquire a connection information list of CMs from the CM list database again. In a case where identifiers indicating reasons for rejecting connection have been transmitted from the CMs, the CE may transmit the identifiers to the CM list database when the CE transmits the acquisition request of CM connection information to the CM list database again. The CM list database may generate a connection information list of recommended CMs on the basis of the identifiers. As described above, the CM list database acquiring information regarding a coexistence profile, a coexistence service to be provided, or the like as the connection information has a merit of reducing an interaction between the CE and the CM afterward. This is because, if the CM list database does not have information regarding the coexistence profile or the coexistence service to be provided, the CE needs to transmit a connection permission request to all CMs in a procedure of acquiring this list of CMs again.

Figure 13:
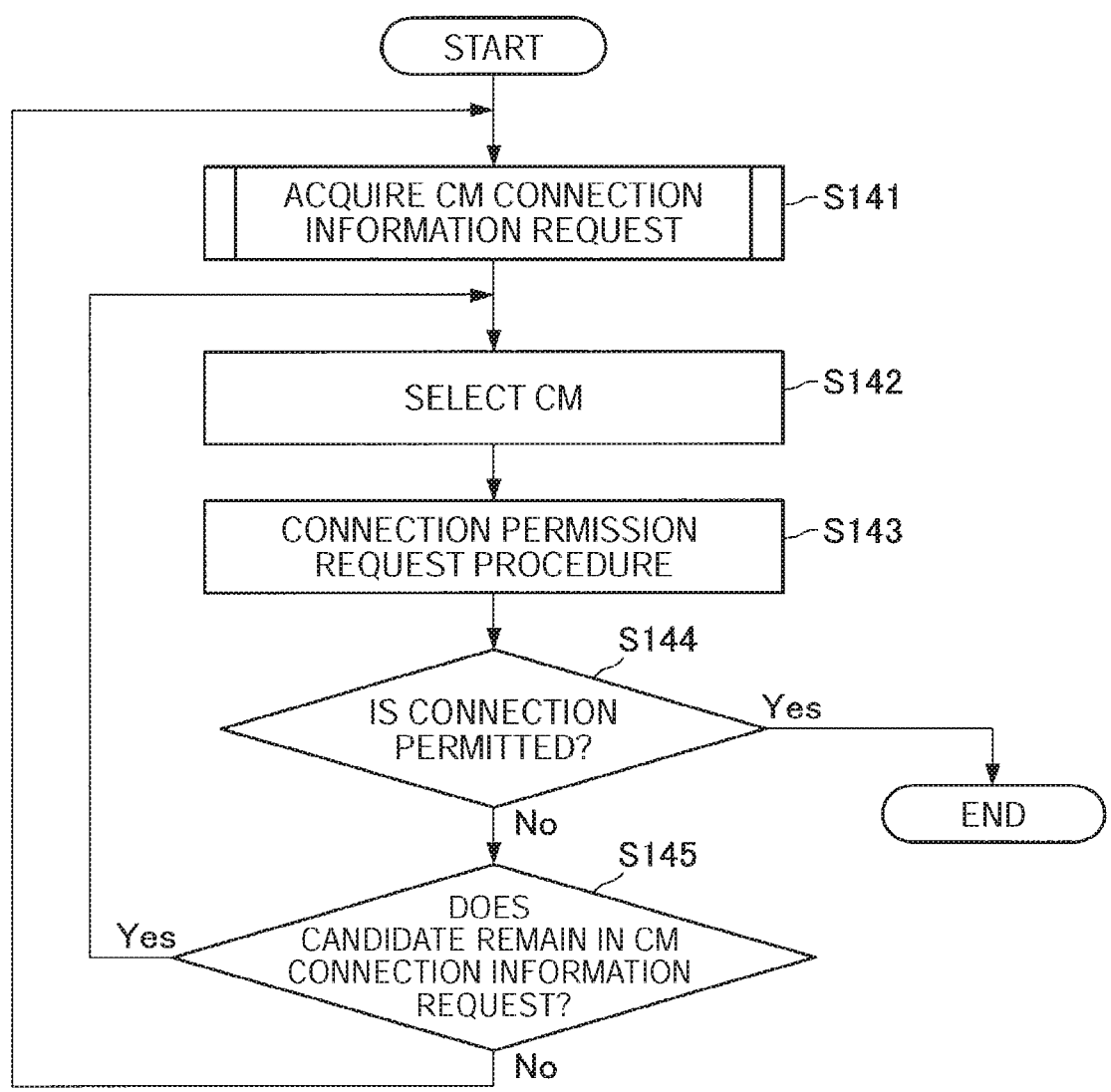
FIG. 13 is a flowchart showing an operation example of a CE.

FIG. 13 is a flowchart showing an operation example of the CE and is a flowchart for organizing and describing the operation of the CE described above.

In a case where the CE attempts to be initially connected to a CM, the CE first acquires a connection information list of CMs from the CM list database (Step S141). When the connection information list of CMs is acquired from the CM list database, then the CE selects a CM from the list on the basis of a predetermined reference regarding information necessary for communication control for coexistence (Step S142)

When the CM is selected on the basis of the predetermined reference regarding information necessary for communication control for coexistence, the CE executes a connection permission request procedure with respect to the selected CM (Step S143)

The CE determines whether or not connection is permitted by the CM to which the connection permission request has been transmitted (Step S144), and, in a case where connection is permitted by the CM (Step S144, Yes), the CE terminates the initial connection procedure. When the CE terminates the initial connection procedure, then the CE may start to perform a procedure specified in IEEE 802.19.1-2014 such as a subscription procedure and a registration procedure.

On the contrary, in a case where connection is not permitted by the CM to which the connection permission request has been transmitted (Step S144, No), the CE determines whether or not a candidate still remains in the connection information list acquired from the CM list database (Step S145). In a case where a candidate remains (Step S145, Yes), the CE returns to the CM selection processing in Step S142. On the contrary, in a case where no candidate remains (Step S145, No), the CE returns to the processing of acquiring a connection information list of CMs in Step S141.

By executing the above series of operation, the CE can select a CM to be initially connected, transmit a connection permission request to the CM, and be therefore connected to the CM. Further, in a case where connection is rejected by the selected CM, the CE can select another CM from the connection information list acquired from the CM list database and transmit a connection permission request to the CM again. Then, in a case where connection is rejected by all the CMs included in the connection information list acquired from the CM list database, the CE can acquire a connection information list from the CM list database again.

The CE may repeat the series of initial connection processing illustrated in FIG. 13 until a CM that permits connection is found and may terminate the initial connection processing in a case where no CM permits connection, even though a connection information list is repeatedly acquired from the CM list database a predetermined number of times.

2. Conclusion

As described above, according to an embodiment of the present disclosure, even in a case where the CE does not store information regarding connection to a CM, the CE can acquire a connection information list from the CM list database and select a CM to be initially connected on the basis of the connection information list.

The CM list database acquires connection information from the CM or CDIS in advance, and therefore, in a case where the CE specifies to be initially connected to the CM, the CM list database can supply information regarding connection to the CM to the CE.

A computer program for causing a processor (e.g., a CPU, a DSP, etc.) provided in a device of the present specification to function as the device (i.e., a computer program for causing the processor to execute operations of the above-described device) can also be created. In addition, a recording medium in which the computer program is recorded may be provided. Moreover, a device that includes a memory storing the computer program and one or more processors that can execute the computer program may also be provided. In addition, a method including operations of constituent elements of the device is also included in the technology of the present disclosure.

Note that it is not necessary for the processing described in this specification with reference to the flowchart and the sequence diagram to be executed in the order shown. Some processing steps may be performed in parallel. Further, some of additional steps can be adopted, or some processing steps can be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication control device including:

a transmission unit configured to transmit an acquisition request of connection information to a storage device storing the connection information for connection to a communication control determination device that controls coexistence of a plurality of wireless systems;

an acquisition unit configured to acquire a response including the connection information from the storage device; and a control unit configured to select, on a basis of at least one reference, a communication control determination device from the connection information received from the storage device, in which the reference relates to information necessary for communication control for the coexistence.

(2)

The communication control device according to (1), in which the control unit selects a communication control determination device on a condition that, as the reference, the communication control determination device possesses a coexistence profile same as a coexistence profile of the own device.

(3)

The communication control device according to (1), in which the control unit selects a communication control determination device on a condition that, as the reference, the communication control determination device provides a coexistence service desired by a communication node connected to the own device.

(4)

The communication control device according to any of (1) to (3), in which the control unit transmits a connection permission request to the selected communication control determination device, and the acquisition unit acquires a response regarding connection permission from the communication control determination device.

(5)

A storage device including:

an acquisition unit configured to acquire connection information for connecting a communication control device that mediates information between a communication control determination device that controls coexistence of a plurality of wireless systems and a communication device that uses the wireless systems, to the communication control determination device;

a storage unit configured to store the connection information for connection to the communication control determination device; and a control unit configured to generate, on a basis of geographical information of the communication control device and network information, connection information regarding connection to the communication control determination device recommended to be connected.

(6)

The storage device according to (5), in which when the storage device receives an acquisition request of the connection information from the communication control device, the storage device transmits the generated connection information to the communication control device.

(7)
The storage device according to (5) or (6), in which
the network information includes information regarding a communication carrier who provides a communication service to the communication device connected to the communication control device.

(8)
The storage device according to any of (5) to (7), in which
the network information includes information regarding a wireless communication scheme possessed by a communication node connected to the communication control device.

(9)
The storage device according to any of (5) to (8), in which
the network information includes a coexistence profile possessed by the communication control device.

(10)
The storage device according to any of (5) to (9), in which
the acquisition unit acquires the connection information transmitted from the communication control determination device in response to an acquisition request of the connection information transmitted to the communication control determination device.

(11)
The storage device according to any of (5) to (10), in which
the acquisition unit acquires the connection information transmitted from a server device that manages information of the plurality of wireless systems in response to an acquisition request of the connection information to the server device.

(12)
The storage device according to any of (5) to (11), in which
the connection information includes at least an IP address of the communication control determination device.

(13)
The storage device according to any of (5) to (12), in which
the connection information includes a coexistence profile possessed by the communication control determination device.

(14)
The storage device according to any of (5) to (13), in which
the connection information includes information regarding a coexistence service providable by the communication control determination device.

(15)
A communication control determination device configured to control coexistence of a plurality of wireless systems, the communication control determination device including:
a control unit configured to record or update, in a server device that manages information of the plurality of wireless systems, connection information for connecting a communication control device that mediates information to a communication device that uses the wireless system to the communication control determination device and provide the connection information to a storage device in response to a request from the storage device.

(16)
The communication control determination device according to (15), in which
the control unit provides not only the connection information but also priority of connection to the storage device.

(17)
The storage device according to (15) or (16), in which
the connection information includes at least an IP address of the own device.

(18)
The storage device according to any of (15) to (17), in which
the connection information includes a coexistence profile possessed by the own device.

(19)
The storage device according to any of (15) to (18), in which
the connection information includes information regarding a coexistence service providable by the own device.

(20)
A server device configured to manage information of a plurality of wireless systems, the server device including
a control unit configured to acquire, from a communication control determination device that controls coexistence of the plurality of wireless systems, connection information for connecting a communication control device that mediates information to a communication device that uses the wireless system to the communication control determination device, and provide the connection information to a storage device in response to a request from the storage device.

(21)
A method including:
transmitting, to a storage device storing connection information for connection to a communication control determination device that controls coexistence of a plurality of wireless systems, an acquisition request of the connection information;
acquiring a response including the connection information from the storage device; and
selecting, on a basis of at least one reference, a communication control determination device from the connection information received from the storage device.

(22)
A method including:
acquiring connection information for connecting a communication control device that mediates information between a communication control determination device that controls coexistence of a plurality of wireless systems and a communication device that uses the wireless systems to the communication control determination device;
storing the connection information for connection to the communication control determination device; and
generating, on a basis of geographical information of the communication control device and network information, connection information regarding connection to the communication control determination device recommended to be connected.

(23)
A method including:
in a case where coexistence of a plurality of wireless systems is controlled, recording or updating, in a server device that manages information of the plurality of wireless systems, connection information for connecting a communication control device that mediates information to a communication device that uses the wireless systems to the communication control determination device and supplying the connection information to the storage device in response to a request from the storage device.

(24)
A method including:
in a case where information of a plurality of wireless systems is managed, acquiring, from a communication control determination device that controls coexistence of the plurality of wireless systems, connection information for connecting a communication control device that mediates information to a communication device that uses the wireless systems to the communication control determination device and supplying the connection information to a storage device in response to a request from the storage device.

(25)

A computer program for causing a computer to execute
transmitting, to a storage device storing connection information for connection to a communication control determination device that controls coexistence of a plurality of wireless systems, an acquisition request of the connection information, acquiring a response including the connection information from the storage device, and selecting, on a basis of at least one reference, a communication control determination device from the connection information received from the storage device.

(26)

A computer program for causing a computer to execute
acquiring connection information for connecting a communication control device that mediates information between a communication control determination device that controls coexistence of a plurality of wireless systems and a communication device that uses the wireless systems to the communication control determination device, storing the connection information for connection to the communication control determination device, and generating, on a basis of geographical information of the communication control device and network information, connection information regarding connection to the communication control determination device recommended to be connected.

(27)

A computer program for causing a computer to execute
in a case where coexistence of a plurality of wireless systems is controlled, recording or updating, in a server device that manages information of the plurality of wireless systems, connection information for connecting a communication control device that mediates information to a communication device that uses the wireless systems to the communication control determination device and supplying the connection information to the storage device in response to a request from the storage device.

(28)

A computer program for causing a computer to execute
in a case where information of a plurality of wireless systems is managed, acquiring, from a communication control determination device that controls coexistence of the plurality of wireless systems, connection information for connecting a communication control device that mediates information to a communication device that uses the wireless systems to the communication control determination device and supplying the connection information to a storage device in response to a request from the storage device.

REFERENCE SIGNS LIST

100, 200, 300, 400 device

The invention claimed is:

1. A communication control device comprising:
circuitry configured to:
transmit an acquisition request of connection information to a storage device, the storage device storing the connection information for connection to a plurality of communication control determination devices, the plurality of communication control determination devices controlling coexistence of a plurality of wireless systems;

acquire a response including the connection information from the storage device, the connection information including a list of two or more of the plurality of communication control determination devices as candidate of initial connection between the communication control device and one of the plurality of communication control determination devices; and select a first communication control determination device from the list of two or more of the plurality of communication control determination devices in the received connection information from the storage device, based on reference, wherein the reference relates to information necessary for communication control for the coexistence.

2. The communication control device according to claim 1, wherein
the circuitry selects the first communication control determination device based on a condition as the reference, the condition indicating that the first communication control determination device possesses a coexistence profile same as a coexistence profile of the communication control device.

3. The communication control device according to claim 1, wherein
the circuitry selects the first communication control determination device based on a condition as the reference, the condition indicating that the first communication control determination device provides a coexistence service desired by a communication node connected to the communication control device.

4. The communication control device according to claim 1, wherein
the circuitry transmits a connection permission request to the first selected communication control determination device, and acquires a response regarding connection permission from the first communication control determination device.

5. The communication control device according to claim 1,
wherein the connection information further includes priority of connection among the two or more of the plurality of communication control determination devices in the list, and
wherein the priority of connection is determined based on at least one of number information of communication control devices connecting to each of the plurality of communication control determination devices in the list, calculation load information of each of the plurality of communication control determination devices in the list, user contract information of the communication control device, and access scheme information between the communication control device and each of the plurality of communication control determination devices in the list.

6. A storage device comprising:
circuitry configured to:
acquire first connection information from a plurality of communication control determination devices each controlling coexistence of a plurality of wireless systems, the first connection information being used for connecting a communication control device to at least one of the plurality of communication control determination devices, the communication control device mediating information between the plurality of communication control determination devices and a communication device using the wireless systems;

store the first connection information for connection to the communication control determination device; and generate second connection information based on geographical information of the communication control device and network information of the communication control device, the second connection information including a list of two or more of the plurality of communication control determination devices as candidate of initial connection between the communication control device and one of the plurality of communication control determination devices.

7. The storage device according to claim 6, wherein when the circuitry receives an acquisition request of the second connection information from the communication control device, the circuitry transmits the generated second connection information to the communication control device.

8. The storage device according to claim 6, wherein the network information includes information regarding a communication carrier who provides a communication service to the communication device connected to the communication control device.

9. The storage device according to claim 6, wherein the network information includes information regarding a wireless communication scheme possessed by a communication node connected to the communication control device.

10. The storage device according to claim 6, wherein the network information includes a coexistence profile possessed by the communication control device.

11. The storage device according to claim 6, wherein the circuitry acquires the first connection information transmitted from the communication control determination device in response to an acquisition request of the first connection information transmitted to the communication control determination device.

12. The storage device according to claim 6, wherein the circuitry acquires the first connection information transmitted from a server device that manages information of the plurality of wireless systems in response to an acquisition request of the first connection information to the server device.

13. The storage device according to claim 6, wherein the second connection information includes at least an IP address of the communication control determination device.

14. The storage device according to claim 6, wherein the second connection information includes a coexistence profile possessed by the communication control determination device.

15. The storage device according to claim 6, wherein the second connection information includes information regarding a coexistence service providable by the communication control determination device.

16. The storage device according to claim 6,
wherein the second connection information further includes priority of connection among the two or more of the plurality of communication control determination devices in the list, and
wherein the priority of connection is determined based on at least one of number information of communication control devices connecting to each of the plurality of communication control determination devices in the list, calculation load information of each of the plurality of communication control determination devices in the list, user contract information of the communication control device, and access scheme information between the communication control device and each of the plurality of communication control determination devices in the list.

17. A communication control determination device configured to control coexistence of a plurality of wireless systems, the communication control determination device comprising:
circuitry configured to:
record or update, in a server device that manages information of the plurality of wireless systems, first connection information for connecting a communication control device that mediates information to a communication device using the wireless system to the communication control determination device; and
provide the first connection information to a storage device in response to a request from the storage device, the storage device generating second connection information based on the first connection information, the second connection information including a list of two or more of a plurality of communication control determination devices including the communication control determination device and other communication control determination device, as candidate of initial connection between the communication control device and one of the plurality of communication control determination devices.

18. The communication control determination device according to claim 17, wherein
the circuitry provides not only the first connection information but also priority of connection to the storage device.

19. The communication control determination device according to claim 18,
wherein the second connection information further includes the priority of connection among the two or more of the plurality of communication control determination devices in the list, and
wherein the priority of connection is determined based on at least one of number information of communication control devices connecting to each of the plurality of communication control determination devices in the list, calculation load information of each of the plurality of communication control determination devices in the list, user contract information of the communication control device, and access scheme information between the communication control device and each of the plurality of communication control determination devices in the list.

20. The communication control determination device according to claim 17, wherein
the first connection information includes at least an IP address of the communication control determination device.

21. The communication control determination device according to claim 17, wherein
the first connection information includes a coexistence profile possessed by the communication control determination device.

22. The communication control determination device according to claim 17, wherein
the first connection information includes information regarding a coexistence service providable by the communication control determination device.

23. A server device configured to manage information of a plurality of wireless systems, the server device comprising:

circuitry configured to:

acquire, from a plurality of communication control determination devices each controlling coexistence of the plurality of wireless systems, first connection information for connecting a communication control device that mediates information to a communication device using the wireless system to at least one of the plurality of communication control determination devices; and provide the first connection information to a storage device in response to a request from the storage device, the storage device generating second connection information based on the first connection information, the second connection information including a list of two or more of the plurality of communication control determination devices as candidate of initial connection between the communication control device and one of the plurality of communication control determination devices.

24. The server device according to claim 23, wherein the second connection information further includes priority of connection among the two or more of the plurality of communication control determination devices in the list, and wherein the priority of connection is determined based on at least one of number information of communication control devices connecting to each of the plurality of communication control determination devices in the list, calculation load information of each of the plurality of communication control determination devices in the list, user contract information of the communication control device, and access scheme information between the communication control device and each of the plurality of communication control determination devices in the list.

* * * * *